United States Patent [19]
Grossman et al.

[11] Patent Number: 5,341,502
[45] Date of Patent: Aug. 23, 1994

[54] DEVICE FOR ASSIGNING A SHARED RESOURCE IN A DATA PROCESSING SYSTEM

[75] Inventors: Anita S. Grossman; Chin-Cheng Kau, both of Austin; Aubrey D. Ogden, Roundrock; Mason L. Weems, Austin, all of Tex.

[73] Assignee: Motorola, Inc., Schaumburg, Ill.

[21] Appl. No.: 989,864

[22] Filed: Dec. 14, 1992

[51] Int. Cl.$^5$ .................. G06F 12/02; G06F 13/14
[52] U.S. Cl. .................. 395/725; 395/425; 364/228.1; 364/238.4; 364/246.6; 364/246.8; 364/281.6; 364/DIG. 1
[58] Field of Search .......... 395/725, 325, 275, 425, 395/800, 650, 200, 775; 370/58.2, 85.1; 340/825.03; 307/518

[56] References Cited

U.S. PATENT DOCUMENTS

| | | | |
|---|---|---|---|
| 4,212,057 | 7/1980 | Devlin et al. | 395/425 |
| 4,395,753 | 7/1983 | Comfort et al. | 364/200 |
| 4,574,350 | 3/1986 | Starr | 364/200 |
| 4,584,644 | 4/1986 | Larner | 395/650 |
| 4,604,694 | 8/1986 | Hough | 395/650 |
| 4,672,536 | 6/1987 | Giroir et al. | 364/200 |
| 4,727,487 | 2/1988 | Masui et al. | 395/67 |
| 4,835,673 | 5/1989 | Rushby et al. | 364/200 |
| 5,003,464 | 3/1991 | Ely et al. | 364/200 |
| 5,115,499 | 5/1992 | Stiffler et al. | 395/425 |
| 5,155,854 | 10/1992 | Flynn et al. | 395/725 |
| 5,239,651 | 8/1993 | Sodos | 395/725 |
| 5,249,290 | 9/1993 | Heizer | 395/650 |
| 5,293,486 | 3/1994 | Jordan et al. | 395/200 |

*Primary Examiner*—Gopal C. Ray
*Attorney, Agent, or Firm*—Lee E. Chastain

[57] ABSTRACT

In accordance with the present invention, a resource allocation array has at least one resource input line (Aj), at least one request for resource input line (Ri) and at least one cell (12) coupled to the at least one resource input line and to the at least one request for resource line. The resource allocation array assigns one resource to one request for the resource. The one resource and the one request for the resource are both of a group of at least one resource and of a group of at least one request for the resource, respectively. The availability and unavailability of the resource is represented by a first and a second predetermined resource signal, respectively. The assertion and non assertion of the request for resource is represented by a third and a fourth predetermined request for resource signal, respectively. The at least one resource input line is associated with one of the at least one resource signals. The at least one request for resource input line is associated with one of the at least one request for resource signals. The cell generates a predetermined signal, toggles the resource signal from the first to the second predetermined resource signal, and toggles the request for resource signal from the third to the fourth predetermined request for resource signal if the one resource signal and the one request for resource signal correspond in logic state to the first and to the third predetermined signals, respectively.

6 Claims, 3 Drawing Sheets

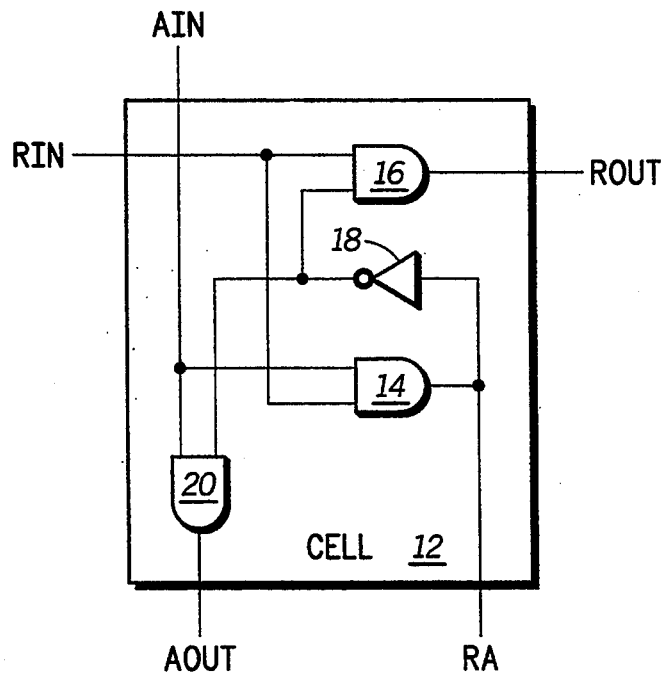
*FIG.2*
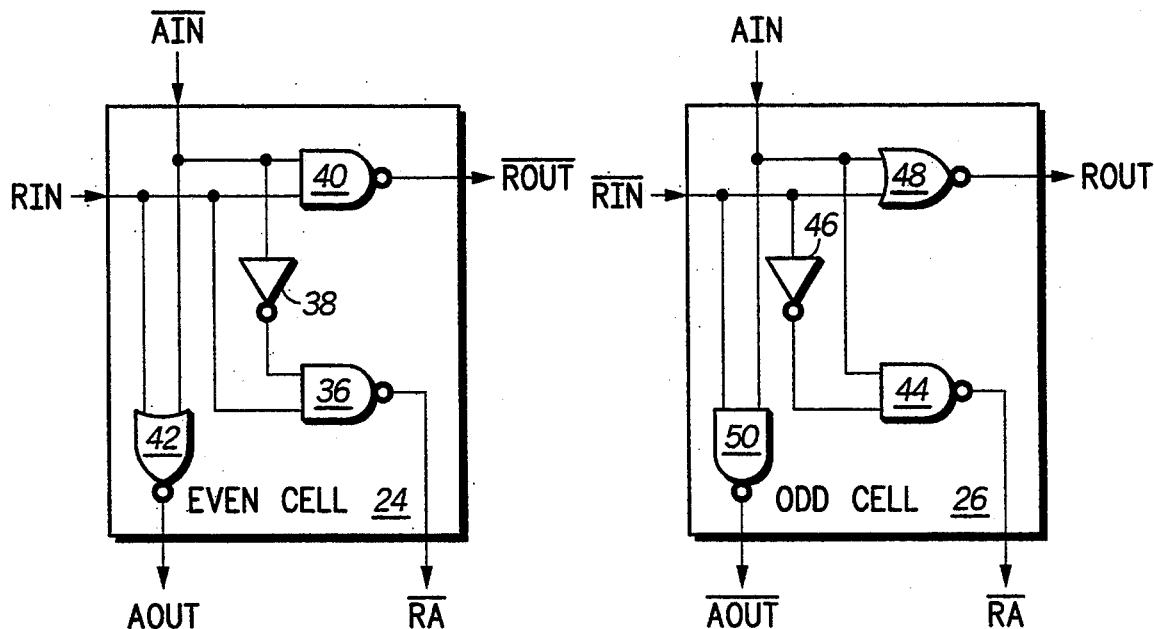
*FIG.4*          *FIG.5*

DEVICE FOR ASSIGNING A SHARED RESOURCE IN A DATA PROCESSING SYSTEM

FIELD OF THE INVENTION

The present invention generally relates to digital computing systems, and more specifically to a resource allocation array.

BACKGROUND OF THE INVENTION

Modem digital computing systems often must allocate resources to requests for the resources. For instance, a data processor may issue three instructions each clock cycle. The same data processor may have, inter alia, two fixed point execution units and a single floating point execution unit. Therefore, the data processor cannot execute three fixed point instructions or three floating point instructions each clock cycle. The described data processor, in fact, may only execute up to two fixed point instructions or a single floating point instruction each clock cycle. Furthermore, it may be the case that one type of execution unit may not accept an instruction every cycle and, hence, is not always available. Some portion of the digital system must therefore be able to determine which execution unit performs which instruction.

Generally, the resources and requests are assigned an "order" within the digital computing system. This order implies that a first request is assigned to the first resource if the first request is requesting and the first resource is available. If the first request is requesting but the first resource is not available, then the first request will be assigned to the second resource if that resource is available. If the second resource is not available, then the first request will be assigned to the third resource, etc. Only after the first request is assigned to a resource or if the first request is initially not requesting will the second, third, etc. requests be allocated to the next available resource. Each request will be assigned to a resource after all previous requests have been assigned to a resource.

Known digital computing systems solve the resource allocation problem by incorporating one or more programmable logic arrays ("PLA") within them or by using general combinatorial logic. These approaches receive N inputs representative of various requests for resources and M inputs representative of the availability of each resource, where N and M are integers. The solutions generate an $N \times M$ output vector representative of which resource is allocated to which request.

In the three instructions per cycle example above, the digital computing system would require two PLAs. The first PLA would generate 6 outputs ($3 \times 2$). This PLA would assign three requests for execution units to two fixed point execution units. The second PLA would generate 3 outputs ($3 \times 1$). This PLA would assign three requests for execution units to a single floating point execution unit.

PLAs generate their output vector using a first level of AND gates driving a second level of OR gates. With only two levels of logic, PLAs are suitable for high speed applications. However, PLAs require an unacceptably large number of gates with as small a $4 \times 4$ or a $3 \times 5$ resource allocation problem. In addition, PLAs require a clock edge to synchronize their operation.

General combinatorial logic schemes generate vector outputs by using a large number of gates without the ordered structure of the PLA. The particular gate combination within a combinatorial logic solution is mathematically equivalent to the desired function.

SUMMARY OF THE INVENTION

In accordance with the present invention, a resource allocation array has at least one resource input line, at least one request for resource input line and at least one cell coupled to the at least one resource input line and to the at least one request for resource line. The resource allocation array assigns one resource to one request for the resource. The one resource and the one request for the resource are both of a group of at least one resource and of a group of at least one request for the resource, respectively. The availability and unavailability of the resource is represented by a first and a second predetermined resource signal, respectively. The assertion and non assertion of the request for resource is represented by a third and a fourth predetermined request for resource signal, respectively. The at least one resource input line is associated with one of the at least one resource signals. The at least one request for resource input line is associated with one of the at least one request for resource signals. The cell generates a predetermined signal, toggles the resource signal from the first to the second predetermined resource signal, and toggles the request for resource signal from the third to the fourth predetermined request for resource signal if the one resource signal and the one request for resource signal correspond in logic state to the first and to the third predetermined signals, respectively.

BRIEF DESCRIPTION OF THE DRAWINGS

The features and advantages of the present invention will be more clearly understood from the following derailed description taken in conjunction with the accompanying FIGURES where like numerals refer to like and corresponding pans and in which:

FIG. 2 depicts a logic diagram of one cell depicted in FIG. 1;

FIG. 4 depicts a logic diagram of the EVEN cell depicted in FIG. 3; and

FIG. 5 depicts a logic diagram of the ODD cell depicted in FIG. 3.

DETAILED DESCRIPTION OF A PREFERRED EMBODIMENT

Figure 1:
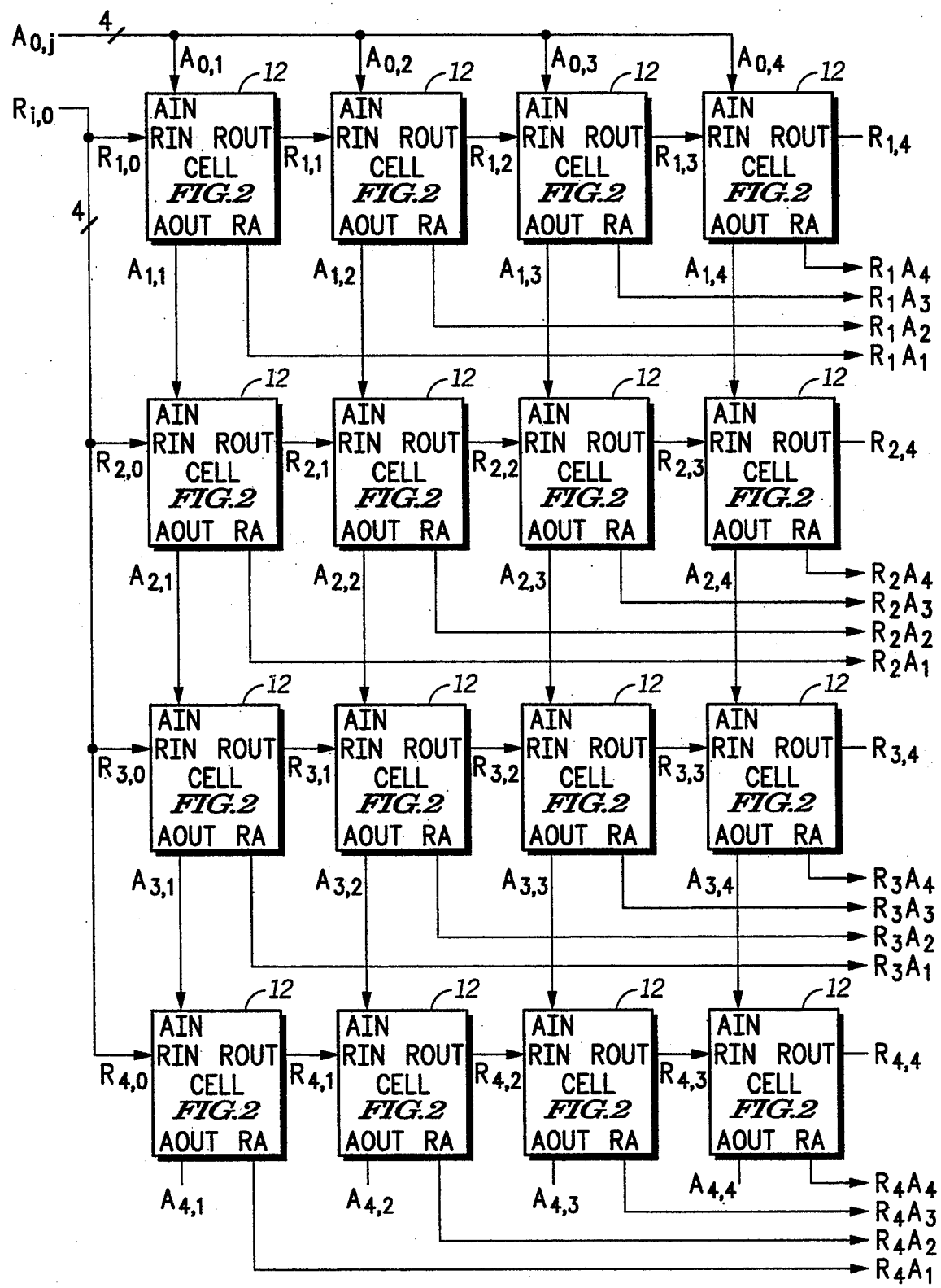
FIG. 1 depicts a block diagram of a first resource allocation array constructed in accordance with the present invention.

FIG. 1 depicts a block diagram of a first resource allocation array 10 (hereafter "RAA") constructed in accordance with the present invention. RAA 10 is a $M \times N$ array, where N and M are integers and will be more fully described below. In the depicted embodiment, RAA 10 is a $4 \times 4$ array having sixteen cells labeled 12. As will become apparent below, the present invention may be easily extended to different size arrays for different combinations of requests for resources and resources. Furthermore, there is no requirement that RAA 10 be square or that either the length of the array be greater or less than the width of the array.

RAA 10 receives two sets of input signals, $R_{i,0}$ and $A_{0,j}$, and generates the output signals $P_iA_j$, where i and j are integer indexes. The integer indexes i and j range from one to the maximum number of requests for resources (hereafter simply "M") and the maximum number of resources (hereafter simply "N"), respectively. Consequently, them are N input signals $A_{0,j}$, M input signals $R_{i,0}$ and (N*M) output signals $R_iA_j$. The input signal $R_{i,0}$ represents a request for the ith resource, the input signal $A_{0,j}$ represents the availability of jth resource, and the output $R_iA_j$ represents whether the jth resource has been assigned to the ith request.

Figure 3:
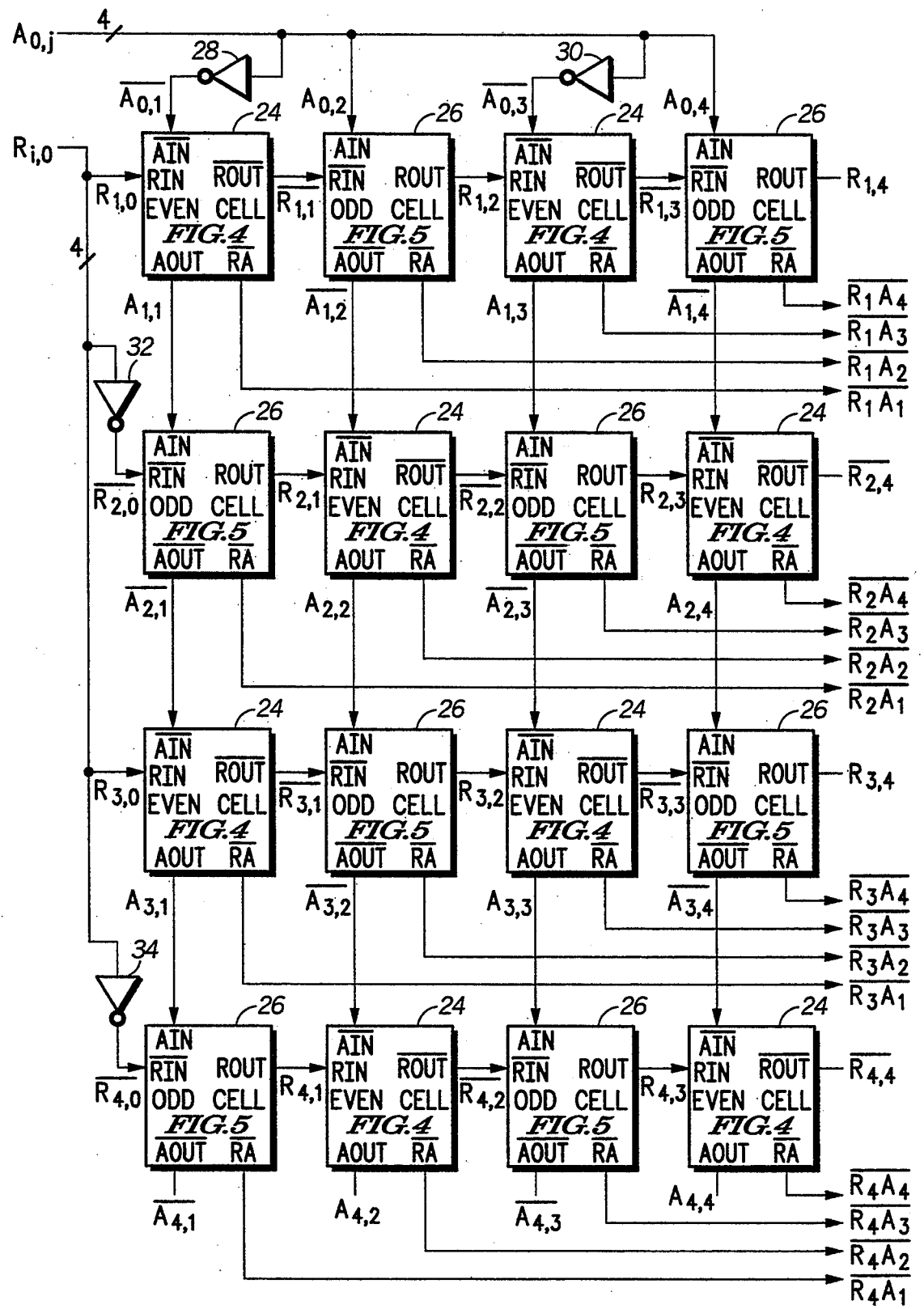
FIG. 3 depicts a block diagram of a second resource allocation array constructed in accordance with the present invention.

Each cell 12 receives two inputs, AIN and RIN, and generates three outputs, ROUT, AOUT and RA. The particular signals that each cell 12 receives and generates depend upon the position of the particular cell within the array of cells. One cell 12 of the group of cells is allocated to each permutation of the indexes i and j. One cell may be said to be "located" at each (i,j) position for purposes of illustration. For instance, the upper left-hand cell is located at the (1,1) array position. The upper right-hand cell is located at the (1,4) array position. There is no requirement that the cells be physically arranged in any geometric pattern. The present invention is depicted in FIGS. 1 and 3 as an M×N rectilinear array for purposes of clearly illustrating the disclosed invention. A cell located at the (i,j) array position receives the signals $R_{i,-1}$ and $A_{i-1,j}$ at the inputs RIN and AIN, respectively. A cell located at the (i,j) array position generates the signals $R_{i,j}$, $A_{i,j}$ and $R_iA_j$ from the outputs ROUT, AOUT and RA, respectively.

It will become apparent below that the signal $R_{i,j}$ is driven to a logic state corresponding to "no request asserted" if the cell at the (i,j) array position assigns the jth resource to the ith request for resource. As a result all signals $R_{i',j}$ will not request a resource, where $i' > i$. In this manner, a second resource will not be erroneously assigned to the same request. Similarly, the signal $A_{i,j}$ is driven to a logic state corresponding to "resource not available" if the cell at the (i,j) array position assigns the jth resource to the ith request for resource. As a result all signals $A_{i,j'}$ will indicate an unavailable resource, where $j' > j$. In this manner, a resource will not be erroneously assigned to two requests. The implication of this toggling scheme and the interconnection of the various cells 12 is to assign the first available resource (lowest value of j) to the first request for resource (lowest value of i), the second available resource to the second request for the resource, etc.

In the example described in the Background of the Invention, the input $R_{i,j}$ may represent whether each instruction in a group of instructions requires a fixed point execution unit to process the instruction. The group of instructions may all be scheduled to issue during the same clock cycle in a particular data processor. The input $A_{0,j}$ would then represent whether each fixed point execution unit in the particular data processor is able to accept a new instruction during the relevant clock cycle. The output $R_iA_j$ would then represent whether the ith instruction was to be processed by the jth fixed point execution unit. This signal could be used by control circuitry to route the appropriate operands to the appropriate execution unit. It should be understood that not all $R_{i,0}$ requests for resource are always requesting, that not all $A_{0,j}$ resources are always available, and that the number of requests and the number of resources are not fixed Both the number of requests for resource and the number of available resources are allowed to be as great as M and N, respectively, and are allowed to change with time. Continuing with the same example, some of the instructions within the group may require different execution units. Furthermore, not all fixed point execution units may be available every clock cycle to begin a new instruction.

FIG. 2 depicts a logic diagram of cell 12 depicted in FIG. 1. An output of an AND gate 14 generates the output RA. A first and second input of AND gate 14 are connected to the inputs RIN and AIN. The input signal RIN is toggled if necessary by an output of an AND gate 16. The output of AND gate 16 generates the output ROUT. A first and a second input of AND gate 16 are connected to the input RIN and to an output of an inverter 18, respectively. An input of inverter 18 is connected to the output of AND gate 14. The input AIN is toggled if necessary by an output of an AND gate 20. And gate 20 generates the output AOUT. A first and a second input of AND gate 20 are connected to the input signal AIN and to the output of inverter 18, respectively. Both of the input signals are toggled to a low logic level (no request for resource and resource unavailable) by a cell located at the (i,j) array position if the cell assigns the ith request to the jth resource. If the particular cell does not assign the ith request to the jth resource, then the cell allows the inputs to propagate to the next cell unaltered.

FIG. 3 depicts a block diagram of a second resource allocation array 22 constructed in accordance with the present invention. RAA 22 is particularly optimized for speed and size constraints. RAA 22 is depicted as a 4×4 array having eight EVEN cells 24 and eight ODD cells 26 arranged in a checkerboard pattern. In particular, each EVEN cell 24 is connected to four ODD cells. Conversely, each ODD cell 26 is connected to four EVEN cells. A cell is connected to less than four cells if it occupies a corner or edge position within RAA 22.

RAA 22 receives two sets of input signals, $R_{i,0}$ and $A_{0,j}$, and generates the output signals $\overline{R_iA_j}$, where i and j are integer indexes. The integer indexes i and j range from one to the maximum number of requests for resources ("M") and the maximum number of resources ("N"), respectively. Consequently, there are N input signals $A_{0,j}$, M input signals $R_{i,0}$ and (N*M) output signals $\overline{R_iA_j}$. The input signal $R_{i,0}$ represents a request for the ith resource, the input signal $A_{0,j}$ represents the availability of jth resource, and the output $\overline{R_iA_j}$ represents whether the jth resource has been assigned to the ith request. As is customary in the art, a bar over a signal indicates that the signal is an active low signal.

Each even cell 24 receives two inputs, $\overline{AIN}$ and RIN, and generates three outputs, $\overline{ROUT}$, AOUT and $\overline{RA}$. Each odd cell 26 receives two inputs, AIN and $\overline{RIN}$, and generates three outputs, ROUT, $\overline{AOUT}$ and $\overline{RA}$. The particular signals that each cell receives and generates depend upon the position of the particular cell within the array of cells. One cell of the group of cells is allocated to each permutation of the indexes i and j. If the sum of the indexes i and j is an even integer, then an even cell 24 is allocated to the permutation. If the sum of the indexes i and j is an odd integer, then an odd cell 26 is allocated to the permutation. For instance, an even cell 24 is allocated to the (1,1) array position (the upper left-hand cell). An odd cell 26 is allocated to the (1,4) array position (the upper right-hand cell). Again, there is no requirement that the cells be physically arranged in any geometric pattern. A cell located at the (i,j) array position where the sum of i and j is even receives the signals $R_{i,j-1}$ and $\overline{A_{i-1,j}}$ at the inputs RIN and $\overline{AIN}$, respectively. The same even cell generates the signals $\overline{R_{i,j}}$, $A_{i,j}$ and $\overline{R_iA_j}$ from the outputs $\overline{ROUT}$, AOUT and $\overline{RA}$, respectively. A cell located at the (i,j) array position where the sum of i and j is odd receives the signals $R_{i,j-1}$ and $\overline{A_{i-1,j}}$ at the inputs $\overline{RIN}$ and AIN, respectively. The same odd cell generates the signals $R_{i,j}$, $\overline{A_{i,j}}$ and $R_iA_j$ from the outputs ROUT, $\overline{AOUT}$ and $\overline{RA}$, respectively.

It will become apparent below that the signals $R_{i,j}$ and $\overline{R_{i,j}}$ are driven to a logic state corresponding to "no request asserted" if the cell at the (i,j) array position assigns the jth resource to the ith request for resource. As a result all signals $R_{i',j}$ and $\overline{R_{i',j}}$ will not request a resource, where i'>i. In this manner, a second resource will not be erroneously assigned to the same request. Similarly, the signals $A_{i,j}$ and $\overline{A_{i,j}}$ will be driven to a logic state corresponding to "resource not available" if the cell at the (i,j) array position assigns the jth resource to the ith request for resource. As a result all signals $A_{i,j'}$ and $\overline{A_{i,j'}}$ will indicate an unavailable resource, where j'>j. In this manner, a resource will not be erroneously assigned to two requests. The implication of this toggling scheme and the interconnection of the various cells is to assign the first available resource (lowest value of j) to the first request for resource (lowest value of i), the second available resource to the second request for the resource, etc.

As depicted in FIG. 3, the polarity of the EVEN and ODD cells is reversed. In particular, EVEN cell 24 receives the signals $R_{i,j-1}$ and $\overline{A_{i-1,j}}$ and generates the signals $\overline{R_{i,j}}$, $A_{i,j}$ and $\overline{R_iA_j}$. Odd cell 26 receives the signals $\overline{R_{i,j-1}}$ and $A_{i-1,j}$ and generates the signals $R_{i,j}$, $\overline{A_{i,j}}$ and $R_iA_j$. In accordance with signal naming conventions, the signals $R_{i,j}$ and $A_{i,j}$ are active high. Conversely, the signals $\overline{R_{i,j}}$ and $\overline{A_{i,j}}$ are active low.

The practical consequence of the polarity reversal between the EVEN and ODD cells is to provide two cells that are each faster than the single cell depicted in FIG. 1 and FIG. 2. Cell 12 can not reverse signal polarity between adjacent cells because its outputs must be compatible with its inputs. The cost of this compatibility is an increase in circuit size and a significant increase in signal propagation time.

As a consequence of the polarity change between the ODD and EVEN cells, inverters 28, 30, 32 and 34 are included to reverse the polarity of the inputs $A_{0,1}$, $A_{0,3}$, $R_{2,0}$ and $R_{4,0}$, respectively.

FIG. 4 depicts a logic diagram of EVEN cell 24 depicted in FIG. 3. An output of a NAND gate 36 generates the output $\overline{RA}$. A first and a second input of NAND gate 36 are connected to the input RIN and to an output of an inverter 38, respectively. An input of inverter 38 is connected to the input $\overline{AIN}$. The polarity of the input RIN is reversed and, if necessary, its value is toggled by an output of a NAND gate 40. NAND gate 40 generates the signal $\overline{ROUT}$. A first and a second input of NAND gate 40 are connected to the input RIN and $\overline{AIN}$, respectively. The polarity of the input $\overline{AIN}$ is reversed and, if necessary, its value is toggled by an output of a NOR gate 42. NOR gate 42 generates the signal AOUT. A first and a second input of NOR gate 42 are connected to the input RIN and $\overline{AIN}$, respectively.

FIG. 5 depicts a logic diagram of ODD cell 26 depicted in FIG. 3. An output of a NAND gate 44 generates the output $\overline{RA}$. A first and a second input of NAND gate 44 are connected to an output of an inverter 46 and to the input AIN, respectively. An input to inverter 46 is connected to the input $\overline{RIN}$. The polarity of the input signal $\overline{RIN}$ is reversed and, if necessary, its value is toggled by an output of a NOR gate 48. The output of NOR gate 48 generates the output ROUT. A first and a second input of NOR gate 48 are connected to the input $\overline{RIN}$ and AIN, respectively. The polarity of the input AIN is reversed and, if necessary, its value is toggled by an output of a NAND gate 50. The output of NAND gate 50 generates the output $\overline{AOUT}$. A first and a second input to NAND gate 50 are connected to the input $\overline{RIN}$ and AIN, respectively.

The disclosed invention provides numerous technical advantages over the prior art. In general, the disclosed invention provides a solution to the resource allocation problem suitable for relatively large numbers of requests for resources and resources. Known PLAs result in a circuit requiring an unacceptably large area to implement given a large number of requests for resources or resources. An embodiment of the disclosed invention is also described that is particularly optimized for speed and size constraints. This embodiment uses two cells that reverse signal polarity between adjacent cells. Furthermore, the disclosed resource allocation array does not require a clock edge to operate. Known PLAs require a clock edge to synchronize their operation.

Although the present invention has been described with reference to a specific embodiment, further modifications and improvements will occur to those skilled in the an. For instance, DeMorgan's Theorem may be used to design different, but equivalent, cells. In particular, an active high output may be generated instead of an active low output by replacing the output NAND gate in each cell with a NOR gate. If such a substitution is made, then the inverter coupled to the NOR gate must be moved from one input to the other input in each modified cell. It is to be understood therefore, that the invention encompasses all such modifications that do not depart from the spirit and scope of the invention as defined in the appended claims.

What is claimed is:

1. A device for assigning a shared resource to a request for the shared resource, the shared resource and the one request for the shared resource of a group of at least one resource and of a group of at least one request for the resource, respectively, the availability and unavailability of the shared resource represented by a resource signal being logically equivalent to a first and second logic state, respectively, the assertion and non assertion of the request for resource represented by a request signal being logically equivalent to a first and second logic state, respectively, the device comprising:

a resource input line associated with a resource signal;

a request for resource input line associated with a request signal;

at least one cell coupled to the resource input line and to the request for resource input line, the at least one cell comprising:

allocation circuitry coupled to the resource input line and to the request for resource input line, the allocation circuitry generating a predetermined signal assigning the shared resource to the request for the resource if both the resource signal and the request signal corresponds to a first logic state;

resource input circuitry coupled to the resource input line and to the request for resource input line, the resource input circuitry toggling the resource signal from the first to a second logic state if both the resource signal and the request signal corresponds to the first logic state; and request for resource input circuitry coupled to the resource input line and to the request for resource input line, the request for resource input circuitry toggling the request signal from the first to the second logic state if both the resource signal and the request signal corresponds to the first logic state.

2. A device for assigning a shared resource to a request for the resource, the shared resource and the one request for the resource of a group of at least one resource and of a group of at least two requests for the resource, respectively, the availability and unavailability of the shared resource represented by a resource signal being logically equivalent to a first and second logic state, respectively, the assertion and non assertion of a first one of the two requests for the resource represented by a first request signal being logically equivalent to a first and second logic state, respectively, the assertion and non assertion of a second one of the two requests for the resource represented by a second request signal being logically equivalent to a first and second logic state, respectively, the device comprising:

a resource input line associated with a resource signal;

a first request for resource input line associated with a first request signal;

a second request for resource input line associated with a second request signal;

at least one first cell coupled to the resource input line and to the first request for resource input line, each first cell generating a predetermined signal assigning the shared resource to the request for the resource, toggling the resource signal from a first to a second logic state, and toggling the first request signal from the first to the second logic state if the resource signal and the first request signal correspond to the first logic state; and at least one second cell coupled to the resource input line and to the second request for resource input line, each second cell generating a predetermined signal assigning the shared resource to the request for the resource, toggling resource signal from the first to the second logic state, and toggling the second request signal from the first to the second logic state if the resource signal and the second request signal correspond to the first logic state.

3. The device of claim 2 wherein each of the first cell and the second cell further comprises:

allocation circuitry coupled to the resource input line and to the request for resource input line, the allocation circuitry generating a predetermined signal if both the resource signal and the request signal corresponds to the first logic state;

resource input circuitry coupled to the resource input line and to the request for resource input line, the resource input circuitry toggling the resource signal from the first to the second logic state if both the resource signal and the request signal corresponds to the first logic state; and request for resource input circuitry coupled to the resource input line and to the request for resource input line, the request for resource input circuitry toggling the request signal from the first to the second logic state if both the resource signal and the request signal corresponds to the first logic state.

4. The device of claim 2 wherein the at least one first cell further comprises:

a first NAND gate comprising a first and a second input, the first input coupled to the resource input line, the second input coupled to the request for resource input line;

an inverter comprising an input and an output, the input coupled to the resource input line;

a second NAND gate comprising a first and a second input, the first input coupled to the request for resource input line and the second input coupled to the output of the inverter; and a NOR gate comprising a first and a second input, the first input coupled to the resource input line, the second input coupled to the request for resource input line.

5. The device of claim 4 wherein the at least one second cell further comprises:

a first NOR gate comprising a first and a second input, the first input coupled to the resource input line, the second input coupled to the request for resource input line;

an inverter comprising an input and an output, the input coupled to the request for resource input line;

a NAND gate comprising a first and a second input, the first input coupled to the resource input line and the second input coupled to the output of the inverter; and a second NAND gate comprising a first and a second input, the first input coupled to the resource input line, the second input coupled to the request for resource input.

6. A device for assigning N shared resources to M requests for the N shared resources, where N and M are integers, the device comprising:

N*M cells, where N and M are integers, for each combination of an integer index i, where i is an integer index running from 1 to M, and an integer index j, where j is an integer index running from 1 to N, each one of the N*M cells comprising:

allocation circuitry receiving a signal $R_{i,j-1}$ and a signal $A_{i-1,j}$, the availability and unavailability of a jth one of N shared resources represented by a signal $A_{0,j}$ being logically equivalent to a first and second logic state, respectively, the assertion and non assertion of an ith one of M requests for the N shared resources represented by a signal $R_{i,0}$ being logically equivalent to a first and second logic state, respectively, the allocation circuitry asserting an output signal $R_iA_j$ if both $R_{i,j-1}$ and $A_{i-1,j}$ corresponds to the first logic state, the assertion of the output $R_iA_j$ representing whether a jth one of the N shared resource is assigned to an ith one of the M requests for the N shared resources;

resource input circuitry receiving the signal $R_{i,j-1}$ and the signal $A_{i-1,j}$, the resource input circuitry asserting a signal $A_{i,j}$ if both $R_{i,j-1}$ and $A_{i-1,j}$ corresponds to a first logic state; and request for resource input circuitry receiving a signal $R_{i,j-1}$ and a signal $A_{i-1,j}$, the request for resource input circuitry asserting a signal $R_{i,j}$ if both $R_{i,j-1}$ and $A_{i-1,j}$ corresponds to a first logic state.

* * * * *